US009637243B2

(12) United States Patent
Tiseo et al.

(10) Patent No.: US 9,637,243 B2
(45) Date of Patent: May 2, 2017

(54) AIRCRAFT LIFT TRANSDUCER

(71) Applicant: Safe Flight Instrument Corporation, White Plains, NY (US)

(72) Inventors: Joseph S. Tiseo, Mamaroneck, NY (US); Randall A. Greene, White Plains, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 166 days.

(21) Appl. No.: 14/139,566

(22) Filed: Dec. 23, 2013

(65) Prior Publication Data
US 2015/0175270 A1   Jun. 25, 2015

(51) Int. Cl.
| | | |
|---|---|---|
| *B64D 45/00* | (2006.01) | |
| *B64C 15/02* | (2006.01) | |
| *B64C 11/00* | (2006.01) | |
| *B64C 13/50* | (2006.01) | |
| *G01M 9/06* | (2006.01) | |
| *G01L 1/14* | (2006.01) | |
| *G01D 5/20* | (2006.01) | |

(52) U.S. Cl.
CPC ............ *B64D 45/00* (2013.01); *B64C 11/001* (2013.01); *B64C 13/50* (2013.01); *B64C 15/02* (2013.01); *G01L 1/14* (2013.01); *G01M 9/06* (2013.01); *G01D 5/2006* (2013.01)

(58) Field of Classification Search
CPC ........ B64C 11/001; B64C 13/50; B64C 15/02
USPC ....... 244/12.1, 12.2, 12.3, 12.4, 12.5; 701/3, 701/4, 14
See application file for complete search history.

(56) References Cited

U.S. PATENT DOCUMENTS

| 2,486,779 A | 11/1949 | Fairbanks |
| 2,593,339 A | 4/1952 | Ostermann et al. |
| 2,964,264 A * | 12/1960 | Multhopp ............. B64C 23/005 |
| | | 244/12.4 |

(Continued)

FOREIGN PATENT DOCUMENTS

| EP | 0 037 159 | 10/1981 |
| EP | 0 299 436 | 1/1989 |

(Continued)

OTHER PUBLICATIONS

"A Revolution in Sensing Worlds First Inductance-to-Digital Converter," Texas Instruments Brochure (2103).

(Continued)

*Primary Examiner* — Thomas G Black
*Assistant Examiner* — Wae Louie
(74) *Attorney, Agent, or Firm* — Morrison & Foerster LLP

(57) ABSTRACT

An aircraft lift transducer may include a vane, actuator, an LC circuit, and a processor. The vane may be positioned on the leading edge of a wing of the aircraft, where the angle defined by the chord of the wing and the vane changes when the aircraft angle of attack changes. The actuator may be associated with the vane and change position when the angle defined by the vane and the chord changes. The LC circuit may include an induction coil spaced from the actuator and an oscillator. The oscillation frequency of the LC circuit may change when the position of the actuator changes. The processor may receive the change in the oscillation frequency and may determine a corresponding change in an available lift of the aircraft.

19 Claims, 5 Drawing Sheets

(56) References Cited

U.S. PATENT DOCUMENTS

| | | | |
|---|---|---|---|
| 3,750,474 A | 8/1973 | Pollack | |
| 4,093,159 A * | 6/1978 | Gilson | G05D 1/0661 244/187 |
| 4,326,253 A * | 4/1982 | Cooper | G05D 1/0607 244/181 |
| 4,590,475 A * | 5/1986 | Brown | G05D 1/0607 244/76 R |
| 4,651,953 A * | 3/1987 | Kim | F02K 3/08 244/12.1 |
| 4,965,879 A * | 10/1990 | Fischer, Jr. | B64C 27/325 244/17.11 |
| 5,035,377 A * | 7/1991 | Buchelt | B64C 11/001 244/12.1 |
| 5,796,612 A * | 8/1998 | Palmer | B64C 13/50 244/12.1 |
| 8,020,804 B2 * | 9/2011 | Yoeli | B64C 15/02 180/117 |
| 2006/0202689 A1 * | 9/2006 | Lefebvre | G01N 27/9053 324/240 |
| 2006/0254255 A1 * | 11/2006 | Okai | B64D 27/24 60/226.1 |
| 2007/0018035 A1 * | 1/2007 | Saiz | B64C 15/00 244/12.3 |
| 2007/0034734 A1 * | 2/2007 | Yoeli | B64C 27/20 244/12.1 |
| 2009/0018703 A1 | 1/2009 | Mangalam et al. | |
| 2010/0318336 A1 * | 12/2010 | Falangas | G06F 17/5095 703/8 |
| 2013/0311013 A1 * | 11/2013 | Rogers | G01P 5/26 701/14 |
| 2013/0333462 A1 | 12/2013 | Argentieri | |
| 2015/0084792 A1 * | 3/2015 | Barth | B64D 43/02 340/966 |
| 2015/0123821 A1 * | 5/2015 | Greene | B64D 45/04 340/967 |
| 2015/0175270 A1 * | 6/2015 | Tiseo | B64D 45/00 701/14 |

FOREIGN PATENT DOCUMENTS

| | | |
|---|---|---|
| EP | 1 962 163 | 8/2008 |
| FR | 1 104 494 | 11/1955 |

OTHER PUBLICATIONS

Communication pursuant to Article 94(3) EPC for EP 14 199 448.3, issued Jun. 3, 2016, 7 pages.
European Search Report for EP 14199448.3, issued May 29, 2015, 10 pages.

* cited by examiner

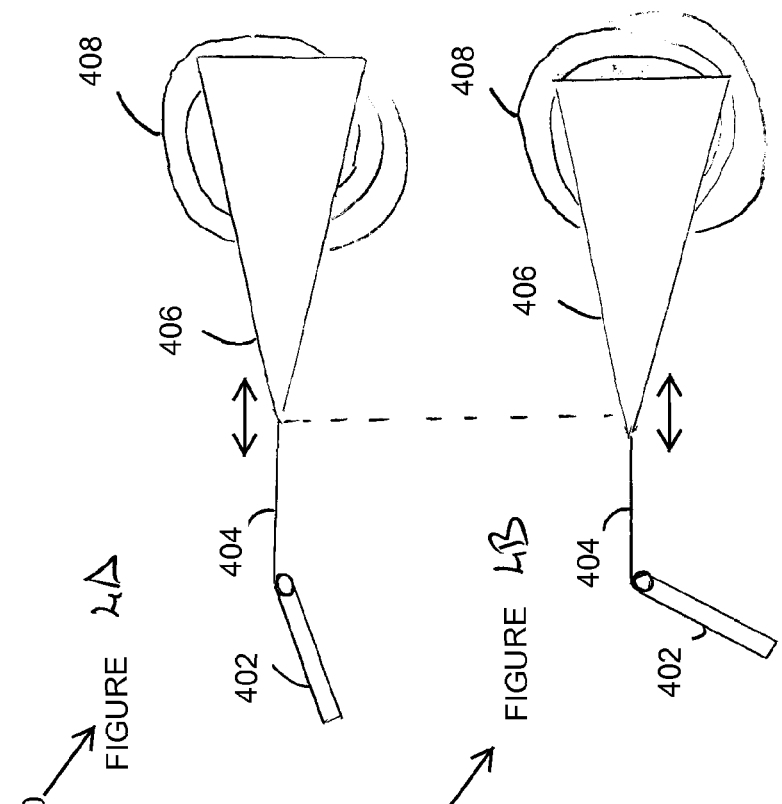
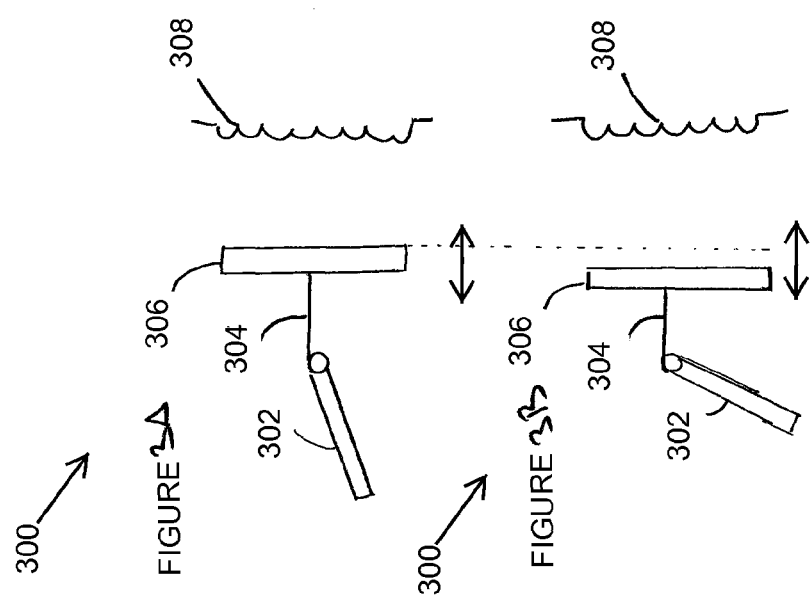

FIGURE 5A
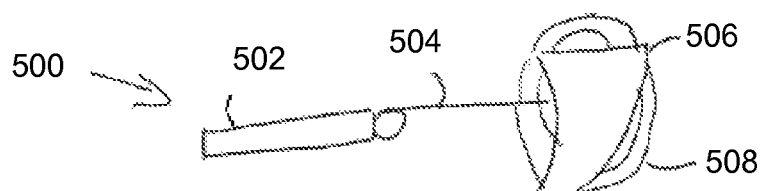
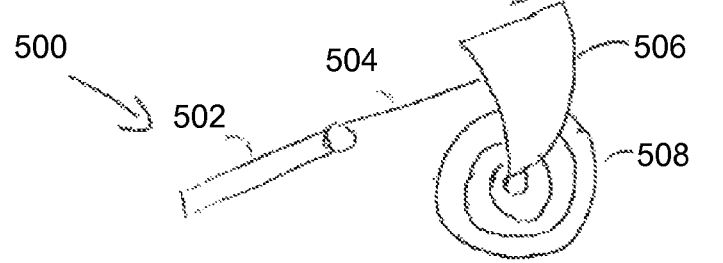
FIGURE 5B

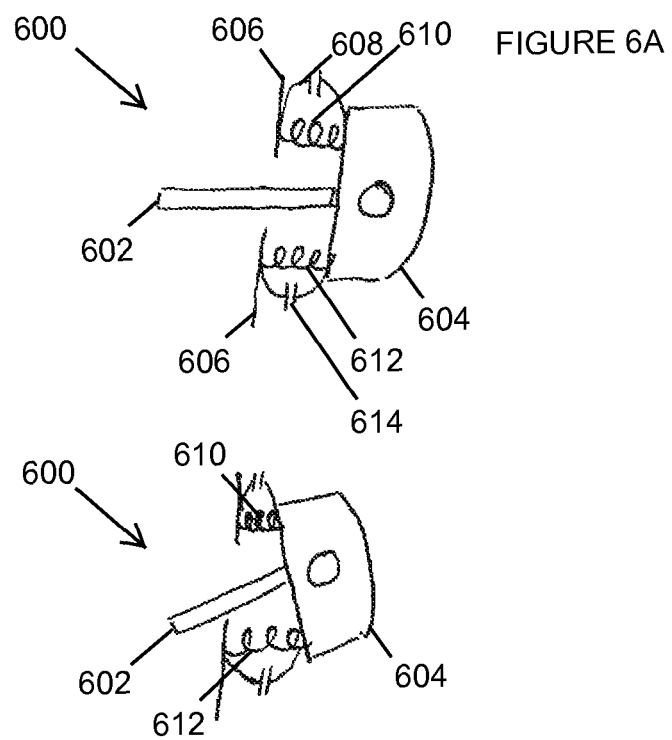

AIRCRAFT LIFT TRANSDUCER

FIELD OF THE DISCLOSURE

This disclosure generally relates to systems and methods for flying an aircraft. More particularly, this disclosure relates to systems and methods for determining an aircraft's available lift.

BACKGROUND

An aircraft's available lift determines proximity to stalling, best rate of climb, best angle of climb, among other flight parameters. Accordingly, accurate determination of an aircraft's available lift is critical to safe and high-performance flight.

Known solutions to determining an aircraft's available lift suffer from a variety of drawbacks. For example, known solutions may lack accuracy because they are not positioned sufficiently close to a leading edge of a wing or lack adequate sensitivity. Also, some known solutions may degrade over time when, for example, mechanical components interact and wear or contaminants interfere with components' interactions.

SUMMARY

This disclosure relates to systems and methods for measuring an available lift of the aircraft. Advantageously, the systems and methods provide a highly sensitive and durable lift transducer.

In one embodiment, a lift transducer may include a vane, an actuator, an LC circuit, also known as a resonant circuit, and a processor. The vane may be positioned on a leading edge of a wing of the aircraft such that a change in an angle of attack of the aircraft changes an angle of the vane relative to the chord of the wing. The actuator may be coupled to the vane such that the change in the angle of the vane relative to the chord changes a position of the actuator. The LC circuit may include an induction coil spaced from the actuator and an oscillator, wherein the change in position of the actuator changes an oscillation frequency of the LC circuit. The processor may receive the change in the oscillation frequency and may determine a corresponding change in an available lift of the aircraft.

In one embodiment, an aircraft lift transducer may include a vane, actuator, an LC circuit, and a processor. The vane may be positioned on the leading edge of a wing of the aircraft, where the angle defined by the chord of the wing and the vane changes when the aircraft angle of attack changes. The actuator may be associated with the vane and change position when the angle defined by the vane and the chord changes. The LC circuit may include an induction coil spaced from the actuator and an oscillator. The oscillation frequency of the LC circuit may change when the position of the actuator changes. The processor may receive the change in the oscillation frequency and may determine a corresponding change in an available lift of the aircraft.

By positioning the vane on the leading edge of the wing, the lift transducer is highly sensitive to changes in the aircraft's angle of attack. In addition, by spacing the actuator and the induction coil, there is less mechanical wear on the components, and less interference by environmental factors with interactions between the actuator and the induction coil. Thus, the transducer is durable.

In some embodiments, the distance between the actuator and the induction coil may change when the angle of the vane relative to the chord changes. In some embodiments, he distance between the actuator and the induction coil may remain constant when the angle of the vane relative to the chord changes, but the position and shape of the actuator relative to the coil may change. For example, the actuator may be shaped so that the effective area of the actuator exposed to the induction coil changes when the angle of the vane relative to the chord changes. In some embodiments, the transducer may include a capacitor in parallel with the induction coil.

In some embodiments, the vane may be located in proximity to a stagnation point of the wing and the angle defined by the vane and the chord of the wing may change when a location of the stagnation point changes. In some embodiments, the aircraft's available lift may be utilized to determine the angle of attack of the aircraft. In some embodiments, the transducer may include a temperature sensor for compensating a measured oscillation frequency.

In one embodiment, a method of determining an aircraft's available lift may include measuring an oscillation frequency change of an LC circuit and determining a change in available lift from the oscillation frequency change. The circuit may include an oscillator and an induction coil spaced from an actuator. The change in oscillation frequency may be caused by a change in position of the actuator. The change in position of the actuator may be caused by a change in an angle of a vane positioned on a leading edge of a wing of the aircraft. The change in the angle of the vane may result from a change in the angle of attack of the aircraft.

In one embodiment, a method of determining an aircraft's available lift may include measuring an oscillation frequency change of an LC circuit and determining a change in available lift from the oscillation frequency change. The LC circuit may include an oscillator and an induction coil spaced from an actuator, the actuator having a position and a change in the position causing the oscillation frequency change. The aircraft may include a vane positioned on the leading edge of a wing of the aircraft, the chord of the wing and the vane defining an angle and a change in the angle causing the change in the position of the actuator. A change in the angle of attack causing the change in the angle as defined by the vane and the chord.

By positioning the vane on the leading edge of the wing, the method is highly sensitive to changes in the aircraft's angle of attack. In addition, by spacing the actuator and the induction coil, the method reduces the degradation of those components over time due to wear or contamination.

In some embodiments, the distance between the actuator and the induction coil may change when the angle of the vane relative to the chord changes. In some embodiments, the distance between the actuator and the induction coil may remain constant when the angle of the vane relative to the chord changes, and the actuator may be shaped so that the effective area of the actuator exposed to the induction coil changes when the angle of the vane relative to the chord changes. In some embodiments, a capacitor may be connected in parallel to the induction coil.

In some embodiments, the vane is located in proximity to a stagnation point of the wing and the angle defined by the vane and the chord may change when a location of the stagnation point changes. In some embodiments, the method includes utilizing the aircraft's available lift to determine the angle of attack of the aircraft. In some embodiments, the method may include measuring an ambient temperature and adjusting the measured oscillation frequency. This adjustment may compensate for changes in the oscillation frequency caused by changes in temperature.

In one embodiment, an aircraft lift transducer includes a vane, a compressor, an LC circuit, and a processor. The vane may be positioned on a leading edge of a wing of the aircraft, the vane and the wing defining an angle that may change when an angle of attack of the aircraft changes. The compressor may have a position that changes when the angle defined by the vane and the wing changes. The LC circuit may include an induction coil and an oscillator, where the circuit may have an oscillation frequency that changes when the induction coil is compressed by the compressor. The processor may receive the change in the oscillation frequency and determining a corresponding change in an available lift of the aircraft.

BRIEF DESCRIPTION OF THE DRAWINGS

FIG. 3A depicts an example of components of a lift transducer when an aircraft is at a first angle of attack, in accordance with an embodiment. FIG. 3B depicts an example of the components of the transducer of FIG. 3A when the aircraft is at a second angle of attack.

FIG. 4A depicts an example of components of a lift transducer when an aircraft is at a first angle of attack, in accordance with an embodiment. FIG. 4B depicts an example of the components of the transducer of FIG. 4A when the aircraft is at a second angle of attack.

FIG. 5A depicts an example of components of a lift transducer when an aircraft is at a first angle of attack, in accordance with an embodiment. FIG. 5B depicts an example of the components of the transducer of FIG. 5A when the aircraft is at a second angle of attack.

FIG. 6A depicts an example of components of a lift transducer when an aircraft is at a first angle of attack, in accordance with an embodiment. FIG. 6B depicts an example of the components of the transducer of FIG. 6A when the aircraft is at a second angle of attack.

DETAILED DESCRIPTION

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

In some embodiments, an aircraft lift transducer may include a vane, actuator, an LC circuit, and a processor. The vane may be positioned on the leading edge of a wing of the aircraft, where the angle defined by the wing and the vane changes when the aircraft angle of attack changes. The actuator may be associated with the vane and change position when the angle defined by the vane and the wing changes. The LC circuit may include an induction coil spaced from the actuator and an oscillator. The oscillation frequency of the LC circuit may change when the position of the actuator changes. The processor may receive the change in the oscillation frequency and may determine a corresponding change in an available lift of the aircraft. Advantageously, the systems and methods provide a highly sensitive and durable lift transducer.

Figure 1A:
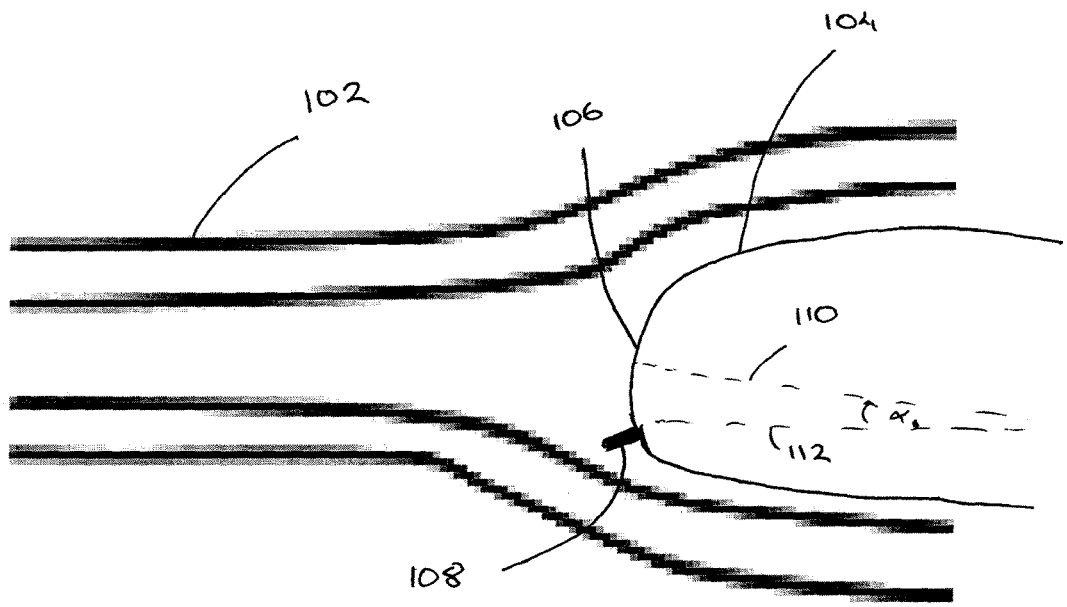
FIG. 1A depicts an example of a cross section of an aircraft wing at angle of attack $\alpha_1$, in accordance with an embodiment.

FIG. 1A depicts an example of a cross section of an aircraft wing 102 at angle of attack $\alpha_1$, in accordance with an embodiment. As used herein, an aircraft's angle of attack can be understood to include the angle between a reference line of the aircraft (for example, the chord line, identified as 110 in FIG. 1A) and a flight-path (a vector representing the relative motion of the aircraft through the surrounding air 102, identified as 112 in FIG. 1A).

Aircraft wing 104 includes a leading edge 106 with vane 108 located on the leading edge and on the surface of the wing. When the wing is at angle of attack $\alpha_1$, vane 108 is oriented at a first angle to the surface of the wing.

Figure 1B:
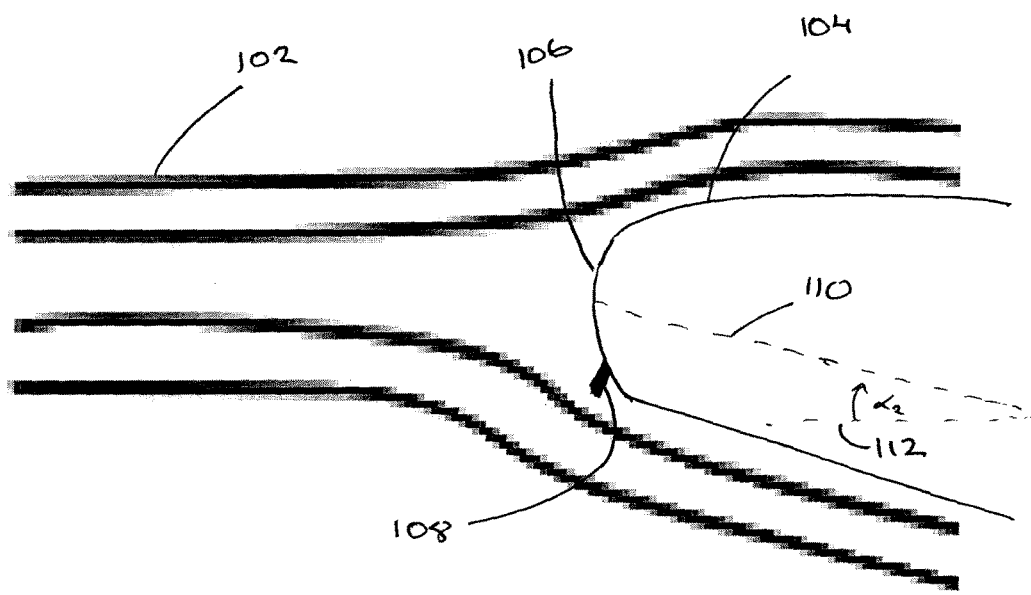
FIG. 1B depicts an example of a cross section of the aircraft wing of FIG. 1A at angle of attack $\alpha_2$.

FIG. 1B depicts an example of a cross section of the aircraft wing of FIG. 1A at angle of attack $\alpha_2$. At this angle of attack, vane 108 is oriented at a second angle to the surface of the wing. The change in angle of the vane results from changes in pressure surrounding the leading edge of the surface of the wing. In some embodiments, the change in angle of vane 108 may be utilized to determine the available lift of aircraft wing 104.

Advantageously, by positioning the vane on the leading edge of the wing, a lift transducer can be highly sensitive to changes in the aircraft's available lift.

Figure 2:
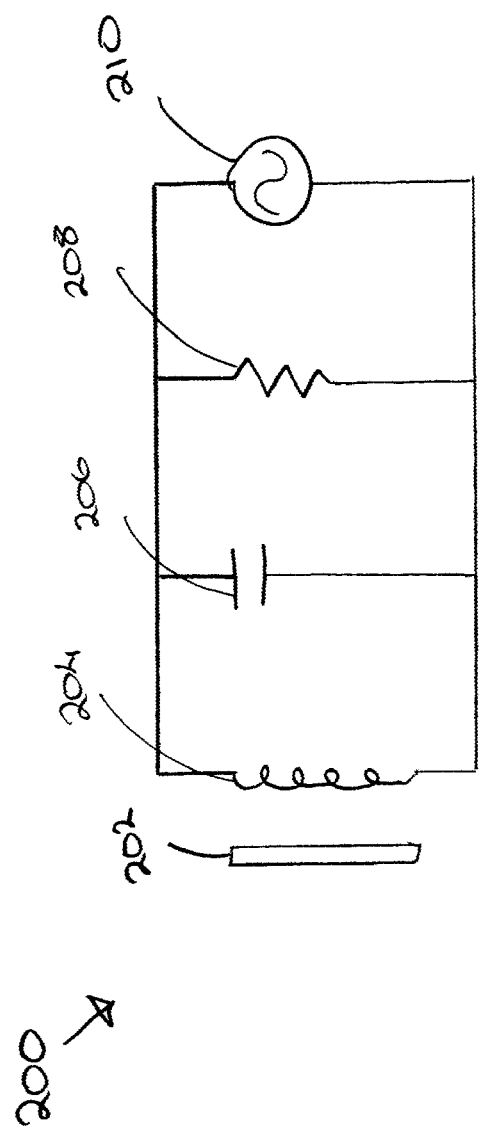
FIG. 2 depicts an example of a circuit diagram for a lift transducer, in accordance with an embodiment.

FIG. 2 depicts an example of a circuit diagram of LC circuit 200 used in a lift transducer, in accordance with an embodiment. Circuit 200 includes induction coil 204 and oscillator 210. Oscillator 210 produces an alternating current in circuit 200 which includes an oscillation frequency. The alternating current produces an oscillating magnetic field around coil 204.

As used herein, an LC circuit can be understood to be a resonant circuit containing an inductor. Actuator 202 is spaced from coil 204 so as to produce eddy currents on actuator 202 when current flows through circuit 200. These eddy currents affect the magnetic field surrounding the coil, which affect the oscillation frequency of circuit 200.

A change in the distance between actuator 202 and coil 204 produces a corresponding change in the oscillation frequency of circuit 200 (this aspect is explained further with reference to FIGS. 3A and 3B). Similarly, a change in the size of the interaction between actuator 202 and coil 204 will also produce a corresponding change in the oscillation frequency of circuit 200 (this aspect is explained further with reference to FIGS. 4A and 4B).

Circuit 200 also includes capacitor 206 and resistor 208. Capacitor 206 may reduce the dissipation of power of the system, thereby improving efficiency. In some embodiments, capacitor 206 and resistor 208 are not present.

In some embodiments, actuator 202 is connected to a vane located on the surface of the wing. As the angle of attack of the aircraft changes, the pressure above and below the vane changes, resulting in changes in an orientation of the vane. Changes in the orientation of the vane cause changes in the position of actuator 202 relative to the induction coil 204. Consequently, changes in an orientation of the vane can indirectly cause changes in the oscillation frequency of LC circuit 200. Thus, changes in the angle of attack of an aircraft can be measured by changes in the oscillation frequency of the LC circuit and used to determine available lift.

To determine available lift, an angle of attack is chosen as a benchmark. Once that flight condition is chosen, deviations from that flight condition will result in changes in the pressure surrounding the vane. As described above, changes in the angle of attack will result in changes in the pressure surrounding the vane, which ultimately can be used to determine a change in the available lift.

In some examples, a lift transducer is utilized to determine an angle of attack of the aircraft. From the lift transducer output, a coefficient of lift is determined by reference to the change in pressure. In addition, a stall point location is determined by reference to the change in pressure. From the coefficient of lift and the stall point, the angle of attack of the aircraft can be determined.

FIG. 3A depicts an example of components of lift transducer 300 when an aircraft is at a first angle of attack, in accordance with an embodiment. The illustrated components of lift transducer 300 include vane 302, coupling system 304, actuator 306, and induction coil 308. Coupling system 304 operatively connects vane 302 to actuator 306 such that a change in the orientation of vane 302 moves actuator 306.

FIG. 3B depicts an example of the components of transducer 300 when the aircraft is at a second angle of attack different from the first. As a result of the change of angle of attack, the orientation of vane 302 has changed. The change in orientation has resulted in actuator 306 moving away from coil 308. As explained earlier with respect to FIG. 2, this change in distance between actuator 306 and induction coil 308 will result in changes in the oscillation frequency of an LC circuit which includes induction coil 308. This change in oscillation frequency can then be utilized to determine the change in pressure on the vane.

Accordingly, a change in the available lift of the associated aircraft can be measured indirectly by an LC circuit connected to coil 308 via actuator 306. Advantageously, by spacing the actuator and the induction coil, there is no mechanical wear on the components, nor can environmental factors substantially interfere with interactions between the actuator and the induction coil.

FIG. 4A depicts an example of components of lift transducer 400 when an aircraft is at a first angle of attack, in accordance with an embodiment. FIG. 4B depicts an example of the components when the aircraft is at a second angle of attack, different from the first.

Transducer 400 differs from transducer 300 in that the distance between actuator 406 and induction coil 408 remains constant as vane 402 changes its orientation. To measure the change in orientation, actuator 406 is non-uniformly shaped such that different cross-sections of actuator 406 provide different interactions with induction coil 408.

In this way, a change in relative position of actuator 406 and induction coil 408 causes a change in the oscillation frequency of an associated LC circuit. Accordingly, a change in the available lift on the wing can be measured indirectly by an LC circuit connected to coil 408.

FIG. 5A depicts an example of components of lift transducer 500 when an aircraft is at a first angle of attack, in accordance with an embodiment. FIG. 5B depicts an example of the components when the aircraft is at a second angle of attack, different from the first.

Transducer 500 differs from transducer 300 in that the distance between actuator 506 and induction coil 508 remains constant as vane 502 changes its orientation. Transducer 500 differs from transducer 400 in that deflection of vane 502 causes coupling system 504 to pivot and, consequently, rotate actuator 506 about the pivot point. This causes a change in the effective area of actuator 506 that interacts with coil 508.

In this way, a change in relative position of actuator 506 and induction coil 508 causes a change in the oscillation frequency of an associated LC circuit. Accordingly, a change in the available lift on the wing can be measured indirectly by an LC circuit connected to coil 508.

Although not shown in FIGS. 3A, 3B, 4A, 4B, 5A, and 5B, transducers 300, 400, 500 may include a mechanism to oppose movement of the vane and actuator. In this way, the relative movement of the vane and actuator will reversed when the pressure on the vane is removed. As will be readily understood by one skilled in the art, there are a variety of mechanisms by which to achieve such a reversal of movement.

FIG. 6A depicts an example of components of lift transducer 600 when an aircraft is at a first angle of attack, in accordance with an embodiment. FIG. 6B depicts an example of the components when the aircraft is at a second angle of attack, different from the first.

The illustrated components of lift transducer 600 include vane 602, compressor/expander 604, airplane wing surface 606, first induction coil 610 and associated circuit 608, and second induction coil 612 and associated circuit 612.

When the angle of the vane changes, as shown in FIG. 6B, compressor/expander 604 compresses first coil 610 and allows second coil 612 to expand. By compressing and expanding the coils, the oscillation frequency in the associated circuits will change. This change in oscillation frequency can then be utilized to determine the change in pressure on the vane. Accordingly, a change in the available lift on the wing can be measured indirectly by an LC circuit connected to either coil 610 or 612.

In some embodiments, a lift transducer may include a temperature sensor for measuring the ambient temperature. This transducer may be used to offset the measured oscillation frequency to compensate for temperature sensitive aspects of the transducer.

In one embodiment, a method of determining an aircraft's available lift may include measuring an oscillation frequency change of an LC circuit and determining a change in available lift from the oscillation frequency change. The circuit may include an oscillator and an induction coil spaced from an actuator. The change in oscillation frequency may be caused by a change in position of the actuator. The change in position of the actuator may be caused by a change in an angle of a vane positioned on a leading edge of a wing of the aircraft. The change in the angle of the vane may result from a change in the angle of attack of the aircraft.

In one embodiment, a method of determining an aircraft's available lift may include measuring an oscillation frequency change of an LC circuit and determining a change in available lift from the oscillation frequency change. The LC circuit may include an oscillator and an induction coil spaced from an actuator, the actuator having a position and a change in the position causing the oscillation frequency change. The aircraft may include a vane positioned on the leading edge of a wing of the aircraft, the wing and the vane defining an angle and a change in the angle causing the change in the position of the actuator. A change in the angle of attack causing the change in the angle defined by the vane and the wing.

By positioning the vane on the leading edge of the wing, the method is highly sensitive to changes in the aircraft's angle of attack. In addition, by spacing the actuator and the induction coil, the method reduces the degradation of those components over time.

In some embodiments, the distance between the actuator and the induction coil may change when the angle of the vane relative to the wing changes. In some embodiments, the distance between the actuator and the induction coil may remain constant when the angle of the vane relative to the wing changes, and the actuator is triangular.

In some embodiments, the vane is located in proximity to a stagnation point of the wing and the angle defined by the vane and the wing may change when a location of the stagnation point changes. In some embodiments, the method includes utilizing the aircraft's available lift to determine the angle of attack of the aircraft. In some embodiments, the method includes measuring an ambient temperature and adjusting the measured oscillation frequency.

In some embodiments, a computer may utilize a lift transducer described herein to provide additional functionality to a crew or to other aircraft systems. In further embodiments, the computer may provide input for an autopilot system, an autothrottle system, provide a stall warning, establish the best rate of climb, best angle of angle, or best endurance, for example. In some embodiments, the computer may also receive inputs of the flap positions, thrust of the aircraft, airspeed of the aircraft, barometric pressure, or altitude.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aircraft lift transducer comprising:
   a vane positioned on a leading edge of a wing of the aircraft, the vane and the wing defining an angle that changes when an angle of attack of the aircraft changes,
   an actuator associated with the vane, the actuator having a position that changes when the angle defined by the vane and the wing changes,
   an LC circuit comprising an induction coil spaced from the actuator and an oscillator, the LC circuit having an oscillation frequency that changes when the position of the actuator changes, and
   a processor receiving a change in the oscillation frequency and determining a corresponding change in an available lift of the aircraft.

2. The lift transducer of claim 1, wherein the actuator and the induction coil are spaced by a distance that changes when the angle defined by the vane and the wing changes.

3. The lift transducer of claim 1, wherein the actuator and the induction coil are spaced by a fixed distance and wherein the actuator is shaped.

4. The lift transducer of claim 1, wherein the vane is located in proximity to a stagnation point of the wing and wherein the angle defined by the vane and the wing changes when a location of the stagnation point changes.

5. The lift transducer of claim 1, wherein the aircraft's available lift is utilized to determine an angle of attack of the aircraft.

6. The lift transducer of claim 1 comprising a capacitor connected in parallel to the induction coil.

7. The lift transducer of claim 1 comprising a temperature sensor.

8. A method of determining an aircraft's available lift comprising:
   measuring an oscillation frequency change of an LC circuit comprising an oscillator and an induction coil spaced from an actuator, the actuator having a position and a change in the position causing the oscillation frequency change, wherein
   a wing of the aircraft and a vane positioned on the leading edge of the wing define an angle, a change in the angle causing the change in the position of the actuator, a change in the angle of attack causing the change in the angle defined by the vane and the wing, and
   determining a change in the available lift from the oscillation frequency change.

9. The method of claim 8, wherein the actuator and the induction coil are spaced by a distance that changes when the angle defined by the vane and the wing changes.

10. The method of claim 8, wherein the actuator and the induction coil are spaced by a fixed distance and wherein the actuator is triangular.

11. The method of claim 8, wherein the vane is located in proximity to a stagnation point of the wing and wherein the angle defined by the vane and the wing changes when a location of the stagnation point changes.

12. The method of claim 8 comprising utilizing the aircraft's available lift to determine an angle of attack of the aircraft.

13. The method of claim 8, wherein a capacitor is connected in parallel to the induction coil.

14. The method of claim 8 comprising measuring an ambient temperature and adjusting the measured oscillation frequency.

15. An aircraft lift transducer comprising:
   a vane positioned on a leading edge of a wing of the aircraft, the vane and the wing defining an angle that changes when an angle of attack of the aircraft changes,
   a compressor associated with the vane, the compressor having a position that changes when the angle defined by the vane and the wing changes,
   an LC circuit comprising an induction coil and an oscillator, the LC circuit having an oscillation frequency that changes when the induction coil is compressed by the compressor, and
   a processor receiving a change in the oscillation frequency and determining a corresponding change in an available lift of the aircraft.

16. The lift transducer of claim 15, wherein the vane is located in proximity to a stagnation point of the wing and wherein the angle defined by the vane and the wing changes when a location of the stagnation point changes.

17. The lift transducer of claim 15, wherein the aircraft's available lift is utilized to determine an angle of attack of the aircraft.

18. The lift transducer of claim 15 comprising a capacitor connected in parallel to the induction coil.

19. The lift transducer of claim 15 comprising a temperature sensor.

* * * * *